United States Patent
Robinson et al.

(10) Patent No.: US 11,243,813 B2
(45) Date of Patent: Feb. 8, 2022

(54) PROCESS AS A NETWORK SERVICE HUB

(71) Applicant: International Business Machines Corporation, Armonk, NY (US)

(72) Inventors: Todd Douglas Robinson, Longmont, CO (US); Stephen Michael Leonard, Colorado Springs, CO (US); Hamza Yaswi, Sterling, VA (US); Rebecca E. Lutz, Orlando, FL (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 16/203,086

(22) Filed: Nov. 28, 2018

(65) Prior Publication Data

US 2020/0167201 A1    May 28, 2020

(51) Int. Cl.
  *G06F 9/50* (2006.01)
  *G06F 9/455* (2018.01)
  *H04L 29/08* (2006.01)
  *H04L 29/12* (2006.01)
  *H04L 12/24* (2006.01)

(52) U.S. Cl.
  CPC ........ *G06F 9/5038* (2013.01); *G06F 9/45558* (2013.01); *H04L 61/15* (2013.01); *H04L 61/2007* (2013.01); *H04L 67/16* (2013.01); *H04L 67/32* (2013.01); *H04L 41/20* (2013.01)

(58) Field of Classification Search
  CPC ... G06F 9/5038; G06F 9/45558; H04L 61/15; H04L 61/2007; H04L 67/16; H04L 67/32; H04L 41/20
  See application file for complete search history.

(56) References Cited

U.S. PATENT DOCUMENTS

| | | | |
|---|---|---|---|
| 10,516,672 B2 * | 12/2019 | Gupta | G06F 21/41 |
| 2011/0283017 A1 | 11/2011 | Alkhatib et al. | |
| 2016/0127454 A1 | 5/2016 | Maheshwari et al. | |
| 2016/0212012 A1 | 7/2016 | Young et al. | |
| 2016/0373405 A1 * | 12/2016 | Miller | G06F 9/45558 |
| 2018/0159856 A1 * | 6/2018 | Gujarathi | H04L 67/10 |
| 2019/0065275 A1 * | 2/2019 | Wong | G06F 9/5011 |
| 2019/0102280 A1 * | 4/2019 | Caldato | G06F 9/5072 |
| 2019/0272271 A1 * | 9/2019 | Bhattacharjee | G06F 16/2455 |
| 2019/0347127 A1 * | 11/2019 | Coady | G06F 11/3442 |
| 2020/0110625 A1 * | 4/2020 | Warnicke | G06F 9/5083 |

* cited by examiner

*Primary Examiner* — Esther B. Henderson
*Assistant Examiner* — Nazia Naoreen
(74) *Attorney, Agent, or Firm* — Donald J. O'Brien

(57) ABSTRACT

Manage a request for a computing service through a hub solution available on a network. The underlying network fabric is the communication bus between individual processes that make up a service request. A process orchestrator may publish an Internet Protocol (IP) address for service requests such as printing services, email services, Active Directory (AD) services and similar service requests. The process orchestrator may determine which processes are to be executed to complete the service request and offload the processes to an available computing resources on the network. Examples of computing resources for each process include a virtual machine and a hardware based process engine. The process orchestrator may manage the processes and act as the primary point of interface for an endpoint host requesting the service.

13 Claims, 8 Drawing Sheets

PROCESS AS A NETWORK SERVICE HUB

TECHNICAL FIELD

The disclosure relates to computer network resource management.

BACKGROUND

Distributed computing may include a plurality of, e.g., virtual machines operating on a computing platform, such as a server. For example, software as a service (SaaS) includes individual applications or programs offered to tenants without the tenants having to maintain any of the supporting enterprise systems. Platform as a service (PaaS) is a category of cloud computing services that provides a platform allowing customers to develop, run, and manage applications without the complexity of building and maintaining the infrastructure typically associated with developing and launching the application. Some examples of infrastructure as a service (IaaS) includes multiple virtual machine servers running on a single physical host server, to get more efficient use of the single physical host server.

SUMMARY

In general, the disclosure is directed to techniques to implement a process as a network service hub (PaaNSH), which manages a request for service through a hub solution available on a network. The underlying network fabric becomes the communication bus between individual processes that make up a service request. A process orchestrator may publish to the network a listing of service requests the process orchestrator will accept along with a network address associated with each service request. For example, the process orchestrator, or other computing resource, may publish an Internet Protocol (IP) address for each type of service request such as printing services, email services, Active Directory (AD) services and similar service requests. The process orchestrator may determine which processes are to be executed to complete the service request, manage the processes, and act as the primary point of interface for an endpoint host requesting the service (e.g., the requesting device).

The process orchestrator may determine which back end resources (e.g., a process engine) on the network may have available computing and memory capacity to run one or more of the processes that are part of a given service request. In some examples, the process engine may be a virtualized resource. In other examples, the process engine may run on a small processor connected to the network. Upon locating resources, the process orchestrator then assigns the process, and only the process, to a process engine with the available capacity. The process orchestrator may maintain a listing of unpublished backend IP address on the network to process identifiers (PID) for each individual assigned processes that makes up the service request.

In one example, the disclosure is directed to a computing system comprising: at least one processor communicatively coupled to a communication network and at least one computer-readable storage medium storing instructions that are executed by the at least one processor to: receive a service request from a requesting device, wherein the service request is associated with a network address; determine a plurality of processes that, once executed, will complete the service request; assign each process of the plurality of processes to a respective process engine communicatively coupled to the communication network. Responsive to receiving a respective process result from the respective process engine for each of the plurality of assigned processes, the instructions executed by the at least one processor to respond to the service request are further executed by the at least one processor to respond to the service request by making the process results available to the requesting device, via the network address, in order to indicate a completion of the service request.

In some examples, the instructions executed by the at least one processor to respond to the service request may be further executed by the at least one processor to: track whether each of the plurality of assigned processes is complete and responsive to determining that each of the plurality of assigned processes is complete, assemble each respective process result of the plurality of assigned processes into a completed service request; and make the completed service request available to the requesting device.

In another example, the disclosure is directed to a method comprising: receiving, by one or more processors, a service request from a requesting device, wherein the requesting device and the one or more processors are communicatively coupled to a communication network. The method also includes determining, by the one or more processors, a plurality of processes that, once the plurality of processes is executed, will complete the service request and assigning, by the one or more processors, each respective process of the plurality of processes to a respective computing resource communicatively coupled to the communication network. Responsive to receiving a respective process result from the respective computing resource for each of the plurality of assigned processes, responding, by the one or more processors, to the service request at least by sending the process results to the requesting device in order to indicate a completion of the service request.

In another example, the disclosure is directed to computer program product comprising a computer-readable storage medium having program code stored therewith, the program code executable by at least one processor to: receive a service request from a requesting device, wherein the service request is associated with a network address; determine a plurality of processes that, once executed, will complete the service request and assign each process of the plurality of processes to a respective process engine communicatively coupled to the communication network. Responsive to receiving a respective process result from the respective process engine for each of the plurality of assigned processes, respond to the service request by making the process results available to the requesting device, via the network address, in order to indicate a completion of the service request.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
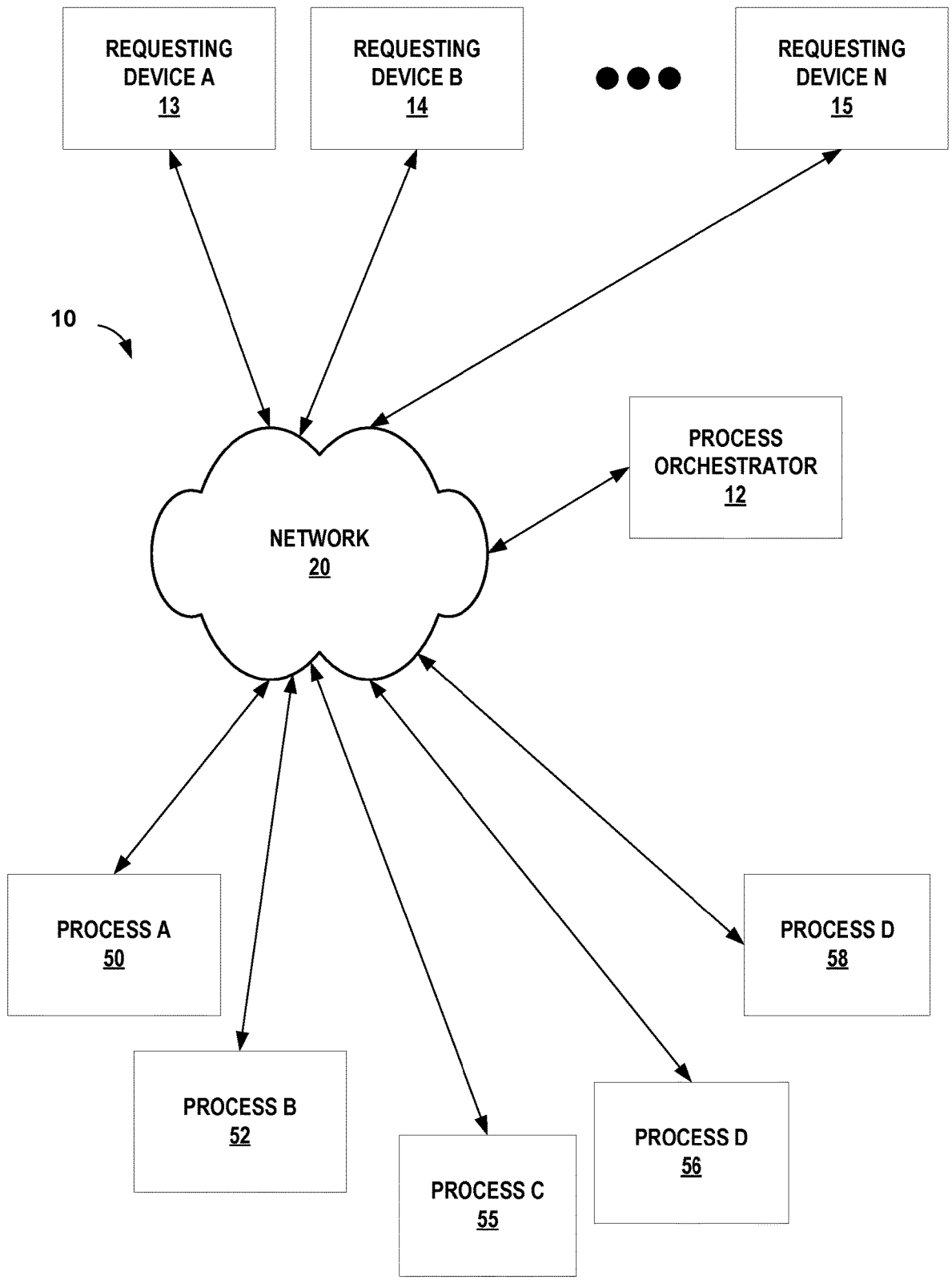
FIG. 1 is a block diagram illustrating an example of process as a network service hub (PaaNSH) using a process orchestrator, in according to one or more techniques of this disclosure.

In some examples of infrastructure as a service (IaaS), multiple virtual machine servers may execute on a single physical host server, to get more use out of the host server. However, when the single host server becomes overloaded, this may delay responses to a service request. In some examples, virtualized systems may send assigned processes to other host servers to ease the workload on any single host server. Current examples of resource management used to run services on multiple host servers may result in complex addressing to locate and offload processes to host servers with more available resource bandwidth. In some examples, these resource management systems may require the requesting device making the service request to keep track of the location and address of the multiple host servers executing the service request.

In contrast, instead of implementing many servers (e.g., virtual servers) running on a single server and serving only one client (e.g., one requesting device), the current disclosure provides techniques for implementing multiple assigned processes that may run individually on multiple computing resources and be accessible on the network via a network address or host name assignment, such as an Internet Protocol (IP) address. This disclosure provides a means to virtualize all the way down to the process level. The network of this disclosure may include a local area network (LAN), a wide area network (WAN), and/or virtual private network (VPN). The computing resources (e.g., process engines) on the network may get authenticated and registered with a process orchestrator via an authentication algorithm.

Once registered, the process orchestrator now has the ability to track the workload, availability, and health of the computing process engines and assign processes to be run by the process engines on the network. The process orchestrator may track the completion of each individual assigned processes associated with the service request. In some examples, the process orchestrator may be implemented as software running at the operating system level. In other examples, the process orchestrator may be a virtualized machine and be integrated with a hypervisor. The requesting device may request and track the results of a service request at a single IP address, rather than by complex addressing, and without the need to track individual assigned processes offloaded to individual process engines.

Specifically, the disclosure is directed to techniques to implement a process as a network service hub (PaaNSH), which breaks a request for service into individual assigned processes, then offloads and manages the individual assigned processes through a hub solution available on a network. The underlying network fabric may become the communication bus between individual assigned processes independently running on the network.

A process orchestrator unit may manage the assigned processes and may act as the primary point of interface for an endpoint requesting device that made the service request. Some examples of service requests may include email services, domain name services (DNS), print services, and Active Directory (AD) services. A requesting device may have access to a published list of services that can be requested. In some examples a requesting device may have a host name assignment for each type of service request similar to a fully qualified domain name (FQDN). For simplicity, this disclosure will refer to host name assignment network addressing as an IP address, though other types of addressing may be used as part of the techniques of this disclosure. The requesting device may, for example, send a service request for AD services to the published IP address associated with AD services. The process orchestrator, as the primary point of interface, may receive the AD service request at the published IP address. In some examples, the requesting device may reach out to the process orchestrator seeking the IP address of a particular service. Once the requesting device receives the IP address for the desired service from the process orchestrator, the requesting device can then request the desired service at the received IP address.

The process orchestrator determines which individual processes are to be assigned and executed to complete the service request. The process orchestrator determines which back end virtualization process engines on the network may have available computing and memory capacity to run one or more of the individual processes. Upon locating resources, the process orchestrator then offloads the workload to the process engine with the available capacity. The process orchestrator may track the progress of the offloaded processes via an IP address on the network associated with a process identifier (PID) for each offloaded individual assigned process. In the example of a virtualized process engine, the IP address for the offloaded PID may be a virtual IP address. In other examples, the IP address may be associated with a small processor acting as a process engine and communicatively coupled to the network.

The process orchestrator may monitor the completion status of all the assigned processes and compiles the results from each assigned process into the completed service request. The process orchestrator may make the results of the completed service request available to the endpoint requesting device that requested the service. In some examples, the process orchestrator may send the results to the requesting device via the IP address used by the requesting device to request the service. In other examples, the process orchestrator may send a notification to the requesting device that the completed service request is available. In other examples, the requesting device may periodically check the IP address for the completed service request results by sending a query. The requesting device may use the IP address for any future service requests of the same type.

By orchestrating launching the offloaded processes on the process engines, tracking the progress and receiving the results of the completed process via a backend IP address to the PID for each assigned process, the process orchestrator makes, in one or more examples, the physical location of the individual assigned processes irrelevant. Unlike other techniques that require complex addressing to track offloaded processes, or for the requesting device to track multiple process engines, the techniques of this disclosure return a single completed service request to the requesting device via the IP address assigned to the service request.

In addition, the techniques of this disclosure provide a means to virtualize all the way down to the process level. The offloaded processes may run on a process engine without the need for the processes to run at the operating system (OS) or application level on a host server.

FIG. 1 is a block diagram illustrating an example of process as a network service hub (PaaNSH) using a process orchestrator, in according to one or more techniques of this disclosure. System 10 depicts several computing devices connected to network 20, where network 20 may include a local area network (LAN), a wide area network (WAN), virtual private network (VPN) and similar communication networks.

System 10 includes process orchestrator 12, requesting device A 13, requesting device B 14, requesting device N 15, and processes A-D (50-58), connected to network 20. System 10 may include computing devices and other configurable computing resources such as servers, processing, memory, storage, applications, virtual machines, and services. In some examples system 10 may be configured for cloud computing. System 10 may include one or more computer program products, which may include a computer readable storage medium (or media) having computer readable program instructions thereon for causing a processor to carry out aspects of the present invention.

Process orchestrator 12 may be implemented as software executed by a processor communicatively coupled to a communication network, such as network 20. In some examples, process orchestrator 12 may be implemented at the OS level and may be directly addressed via an IP address. In other examples, process orchestrator 12 may be implemented as a virtual machine, for example, at the hypervisor level and may be addressed by a virtual IP address. In this disclosure process orchestrator 12 may be referred to as a process orchestrator unit.

Process orchestrator 12 may receive a service request from any of requesting device A 13, requesting device B 14, requesting device N 15 or other requesting device not shown in FIG. 1. A service request may include DNS services, printing services, email services, AD services and similar service requests. Each service request may be associated with a unique IP address. For example, requesting device B 14 may request DNS services at the DNS services IP address and request AD services at the AD services IP address.

Process orchestrator 12 may determine, based on the service request, one or more processes that, once executed, will complete the service request. Process orchestrator 12 may also determine which back-end computing resources (e.g., process engines) may be available to execute the processes to complete the service request. The process engines, which may be communicatively coupled to network 20, may register with process orchestrator 12. Once registered, process orchestrator 12 may maintain a status of the capability, workload, availability, and health of the process engines. Based on the capability and workload of a process engine, process orchestrator 12 may assign the processes that are part of the received service request, e.g. processes A-D (50-58) to be run by the process engines coupled to network 20. In some examples, process orchestrator 12 may determine whether the respective process engine has available computing and memory capacity bandwidth to execute the respective assigned process. Each process engine may be addressed by process orchestrator 12 at a separate, back-end IP address.

Process orchestrator 12 may track the completion of each individual assigned processes associated with the service request. In some examples, process orchestrator 12 may determine an expected timeframe for process A 50 to be completed by the process engine to which process orchestrator assigned process A 50. For example, if the assigned process engine is not completed with process A 50 within an expected timeframe, process orchestrator 12 may reassign process A 50 to a different process engine.

Process orchestrator 12 may receive an indication that one or more of processes A-D (50-55) have been completed by the assigned process engine and that the results of each process is available. In some examples, process orchestrator 12 may assemble the process results from each of processes A-D (50-55) and make the results available to the requesting device. In some examples, process orchestrator 12 may send an indication to the requesting device that the results for the completed service request are available. In other examples, process orchestrator 12 may send the completed service request results to the requesting device via the network address associated with the service request.

In operation, process orchestrator 12 may map the IP address associated with each respective process engine that was assigned a process for a service request to be associated with that service request. For example, requesting device A 13 may request email services at the email services IP address. Process orchestrator 12 may determine which process engines are available to run the processes associated with the email services request from requesting device A 13. Each process engine may have a separate IP address. Process orchestrator 12 may map the separate IP addresses for the process engines that are running each process associated with the email service request, e.g. process B 52, process C 55 and process D 56. In this manner, requesting device A 13 does not need to track the individual processes that have been offloaded to the process engines running process B 52, process C 55 and process D 56. Similarly, requesting device B 14 may also request email services at the same email services IP address. Process orchestrator may again offload process B 52, process C 55 and process D 56 to separate process engines at separate IP addresses. However, the process engines running process B 52, process C 55 and process D 56 associated with the second email services request, i.e. from requesting device B 14, may be different than the process engines that ran the first set of processes for the email services request from requesting device A 13. By mapping the back-end process engines running the processes for the service requests to each separate service request, process orchestrator 12 makes the physical location of the individual assigned processes irrelevant to the requesting device. In this disclosure, each separate service request from the same or different requesting device may be referred to as a "computing job." Each computing job may be a separate service request of the same type from the same requesting device, a service request of a different type from the same requesting device, e.g. an email service request and a DNS service request from requesting device A 13, or any combination.

Figure 2:
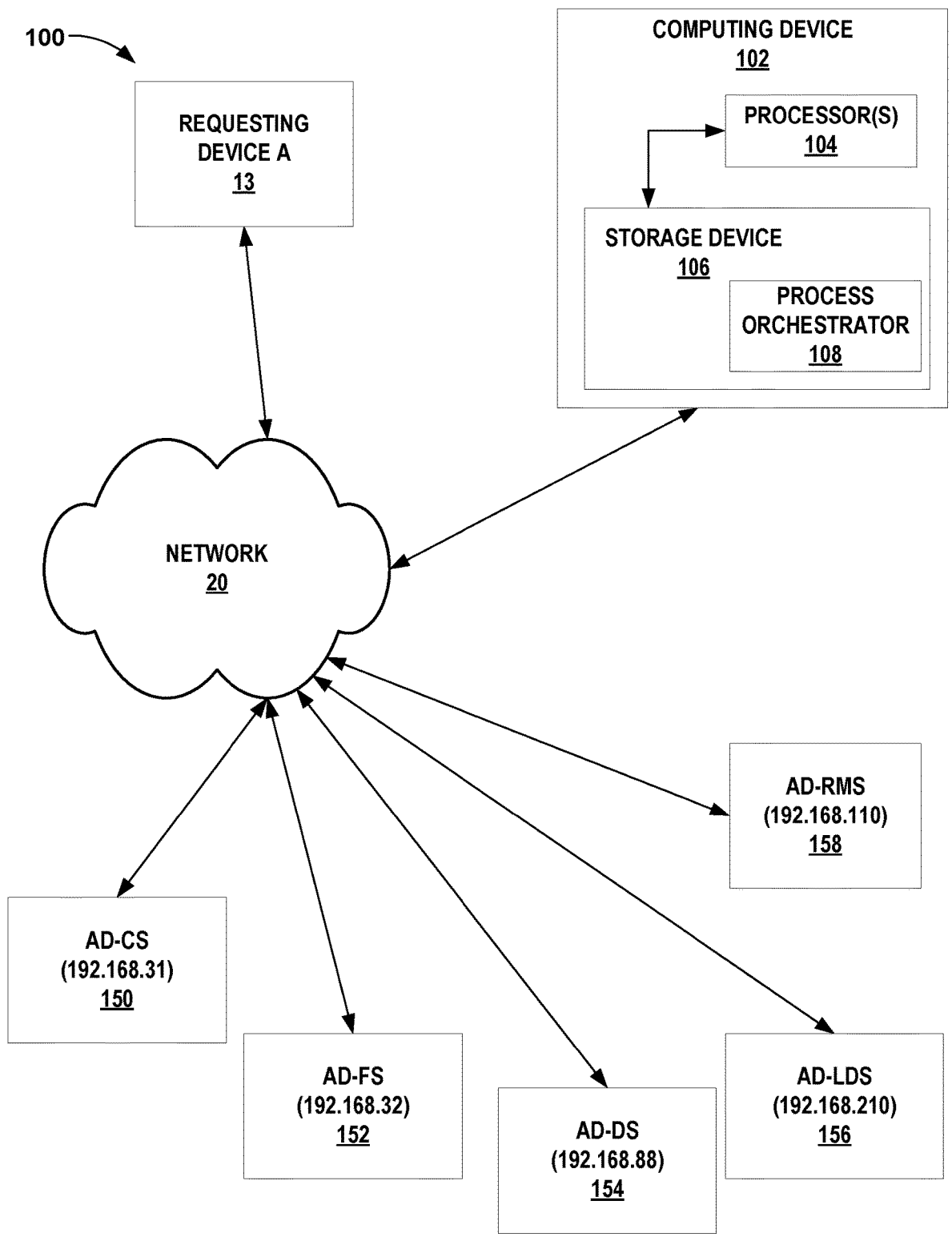
FIG. 2 is a block diagram illustrating the PaaNSH in the example of Active Directory (AD) services, in according to one or more techniques of this disclosure.

FIG. 2 is a block diagram illustrating the PaaNSH in the example of Active Directory (AD) services, in according to one or more techniques of this disclosure. AD is a centralized and standardized system that automates network management of user data, security and distributed resources and enables interoperation with other directories. AD may be used in distributed networking environments, such as the system 100, depicted in FIG. 2 and system 10 described above in relation to FIG. 1.

In the example of FIG. 2, system 100 includes network 20 and requesting device A 13, which perform the same functions as described above in relation to FIG. 1. System 100 also includes computing device 102, and separate AD service processes, also called roles. As described above in relation to FIG. 1, each AD role may be executed on a separate process engine with a respective IP address.

Example computing device 102 may include one or more processors 104, coupled to storage device 106. Storage device 106 may include at least one computer-readable storage medium storing instructions that are executed by processors 104. In some examples the instructions executed by processors 104 may include process orchestrator 108. Process orchestrator 108 is one example of process orchestrator 12 described above in relation to FIG. 1. As with processor orchestrator 12, processor orchestrator 108 may be implemented for example at the operating system level or as a virtualized machine. If virtualized, process orchestrator 108 may be implemented at the hypervisor level. A hypervisor is computer software, firmware or hardware that creates and runs virtual machines on a single piece of computer hardware. In some examples a hypervisor may be referred to as a virtual machine monitor (VMM). A computer on which a hypervisor manages one or more virtual machines may be called a host machine, and each virtual machine may be called a guest machine. The hypervisor presents the guest operating systems with a virtual operating platform and manages the execution of the guest operating systems. Each virtual machine or operating system may be able to run its own programs, it may appear that the guest machine has the host hardware's processor, memory and resources. However, the hypervisor may allocate memory, processing and other resources to the virtual machines. Multiple instances of a variety of operating systems may share the virtualized hardware resources.

AD may provide a single reference, called a directory service, to objects in a network, including users, groups, computers, printers, policies and permissions. The Certificate Services (AD CS 150) role, or process, may be responsible for managing certificates and other cryptographic components in network 20. In the example of FIG. 2, AD CS 150 is executed by a process engine at IP address 192.168.31. As described above in relation to FIG. 1, for a subsequent request for AD services, either from requesting device A 13, or a different re The Federation Services (AD FS 152) role may be used to provide users with single sign-on access to systems and applications located across organizational boundaries, for example to authenticate applications or services outside network 20. In the example of FIG. 2, AD FS 152 is executed by a process engine at IP address 192.168.32.

Domain Services (AD DS 154) role may store and manage information about the network resources. A directory service, such as AD DS may provide methods for storing directory data and making this data available to network users and administrators. For example, AD DS may store information about user accounts, such as names, passwords, phone numbers, and so on, and enables other authorized users on the same network to access this information. In the example of FIG. 2, AD DS 154 is executed by a process engine at IP address 192.168.88.

Lightweight Directory Services (AD LDS 156) role may provide directory services for directory-enabled applications. AD LDS may be used in conjunction with AD DS 154 to provide a central location for security accounts (i.e. using AD DS 154) and another location to support the application configuration and directory data (i.e. using AD LDS 156). In a network, a directory may store information about where in the network something is located. On TCP/IP networks, a domain name server (DNS) is the directory system used to relate the domain name to a specific network address (e.g., 192.168.88). AD LDS 156 mat allow searches for individual network items without knowing the network address and where item is located. In the example of FIG. 2, AD LDS 156 is executed by a process engine at IP address 192.168.210.

Rights Management Services (AD RMS 158) this role provides persistent data protection by enforcing data access policies. AD RMS 158 may be considered an information protection technology that may help safeguard digital information from unauthorized use and may consist of both server and client components. Through a rights-enabled application, content owners may define who can open, modify, print, forward, or take other actions with the content. In the example of FIG. 2, AD RMS 158 is executed by a process engine at IP address 192.168.110.

In operation, process orchestrator 108 may receive a request for AD services from requesting device A 13 at the IP address published for AD services via network 20. In some examples, requesting device A 13 may only know the IP address from process orchestrator 108 but not have the IP address needed for an AD service request. Requesting device A 13 may send a request to process orchestrator 108 for AD services via network 20. Process orchestrator 108 may send the IP address published for AD service requests to requesting device A 13. Requesting device A 13 may then request AD services via the IP address published for AD service requests.

Process orchestrator 108 may determine which back end process engines are available to run the processes associated with the AD service request from requesting device A 13. Process orchestrator 108 may determine which process engines are available by verifying the capability, health, workload or other factors for each process engine. In the example of system 100, process orchestrator 108 offloads AD CS 150 to the process engine located at 192.168.31. Process orchestrator 108 offloads the other AD processes, e.g. AD FS 152. AD DS 154 and so on, to other process engines, as described above. In this manner, requesting device A 13 need only send the AD service request to a single IP address associated with AD services and need not individually manage each of the sub-processes, e.g. AD LDS 156, separately. This may allow more efficient use of processing and memory resources in requesting device A 13 and reduce the need for complex tracking and addressing by requesting device A 13.

Process orchestrator 108 may receive an indication that one or more of processes, e.g. AD RMS 158 has been completed by the assigned process engine located at 192.168.110, and that the results of the process is available. Once all the process engines complete the processes that make up the AD service request, process orchestrator 108 may assemble the process results and make the results available to requesting device A 13 via the IP address associated with the AD service request.

Figure 3:
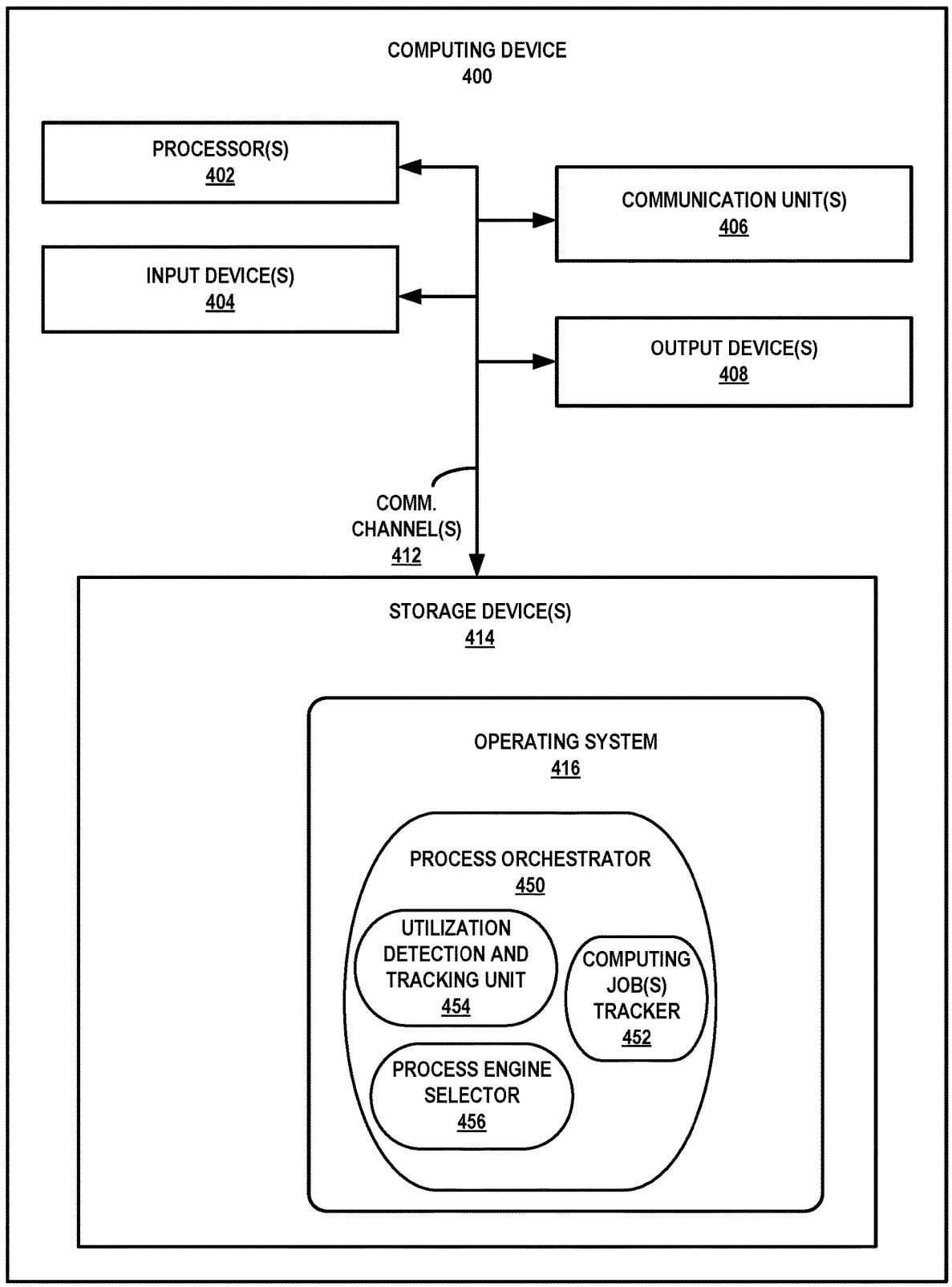
FIG. 3 is a is a block diagram illustrating an example computing device, according to one or more techniques of this disclosure.

FIG. 3 is a is a block diagram illustrating an example computing device, according to one or more techniques of this disclosure. Computing device 400 may be an example of a computing system that may include process orchestrator 12, described above in relation to FIG. 1. Computing device 400 may also be an example of computing device 102 described above in relation to FIG. 2. In other examples, computing device 400 may include any of the process engines described in relation to FIGS. 1 and 2 as well as an example of other computing devices described in this disclosure.

As shown in the example of FIG. 3, computing device 400 may include one or more processors 402, one or more input devices 404, one or more communication units 406, one or more output devices 408, and one or more storage devices 414 and communication channels 412. In other examples, computing device 400 may include fewer, additional, or different components compared to those illustrated in FIG. 3.

Communication channels 412 may interconnect each of the components 402, 404, 406, 408, and 414 for inter-component communications (physically, communicatively, and/or operatively). In some examples, communication channels 412 may include a system bus, a network connection, an inter-process communication data structure, or any other method for communicating data.

One or more input devices 404 of computing device 400 may receive input. Examples of input are tactile, audio, and video input. Input devices 404 of computing device 400, in one example, may include a presence-sensitive display, touch-sensitive screen, mouse, keyboard, voice responsive system, video camera, microphone or any other type of device for detecting input from a human or machine.

One or more output devices 408 of computing device 400 may generate output. Examples of output are tactile, audio, and video output. Output devices 408 of computing device 400, in one example, include a presence-sensitive display, sound card, video graphics adapter card, speaker, cathode ray tube (CRT) monitor, liquid crystal display (LCD), or any other type of device for generating output to a human or machine.

One or more communication units 406 of computing device 400 may communicate with wired or wireless external devices via one or more networks by transmitting and/or receiving network signals on the one or more networks. For example, computing device 400 may use communication unit 406 to transmit and/or receive radio signals on a radio network such as a cellular radio network. Likewise, communication units 406 may transmit and/or receive satellite signals on a satellite network such as a GPS network. Examples of communication unit 406 include a network interface card (e.g. such as an Ethernet card), an optical transceiver, a radio frequency transceiver, a GPS receiver, or any other type of device that can send and/or receive information. Other examples of communication units 406 may include Bluetooth®, GPS, 3G, 4G, and Wi-Fi® radios found in mobile devices as well as Universal Serial Bus (USB) controllers. In other words, computing device 400 may be connected to a network (not shown in FIG. 3), such as network 20 depicted in FIGS. 1 and 2 via communication units 406.

One or more storage devices 414 within computing device 400 may store information for use during operation of computing device 400. In this example, storage devices 414 of computing device 400 may include operating system (OS) 416. OS 416 may in turn include process orchestrator 450, along with other information used during the operation of computing device 400. In the example of FIG. 3, process orchestrator 450 includes utilization detection and tracking unit 454, computing jobs tracker unit 452 and process engine selector unit 456.

Storage devices 414, in some examples, may have the primary purpose of being short term and not long-term computer-readable storage mediums. Storage devices 414 on computing device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 414 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 414 may store program instructions and/or data associated with process orchestrator 450, utilization detection and tracking unit 454, computing jobs tracker unit 452 and process engine selector unit 456.

One or more processors 402 may implement functionality and/or execute instructions within computing device 400. For example, processors 402 on computing device 400 may read and execute instructions stored by storage devices 414 that execute the functionality of process orchestrator 450. In the example of FIG. 3, process orchestrator 450 is implemented at the OS 416 level. In other examples, as described above in relation to FIGS. 1 and 2, a process orchestrator may be implemented as a virtual machine and managed by a hypervisor associated with computing device 400.

A process orchestrator of this disclosure, such as process orchestrator 450 may include a number of different functions including utilization detection and tracking unit 454, computing jobs tracker unit 452 and process engine selector unit 456. In other examples, process orchestrator 450 may include more or fewer functions and may combine functions in a different manner than described for FIG. 3.

A process engine (not shown in FIG. 3), such as the process engines described above in relation to FIGS. 1 and 2, may be implemented as a virtual machine, as part of an application, or implemented directly on the hardware of a computing device. In some examples, a process engine may be implemented on a small microprocessor, for example with some internal memory, that is connected to a network, such as network 20 described above in relation to FIGS. 1 and 2. One or more process engines may register with process orchestrator 450, which may allow process orchestrator 450 to track workload, availability, and health of the process engines as well as assign processes to the process engine. In some examples, the process engines may be authenticated via an authentication algorithm.

Process orchestrator 450 may include a utilization detection and tracking unit 454. Utilization detection and tracking unit 454 may communicate with the registered process engines to monitor and track the workload, capability, location and other features of the process engines connected to network 20.

In some examples, process engine selector unit 456 may use the information from utilization detection and tracking unit 454 to select which process engine should run a given process that may be part of a service request. For example, process engine selector 456 may assign AD FS 152 role to the process engine located at 192.168.32, as described above in relation to FIG. 2.

Computing jobs tracker unit 452 may map the IP address associated with each respective process engine that was assigned a process for a service request. For example, computing jobs tracker unit 452 may map the process engines associated with a first AD service request from requesting device A 13, such as 198.168.31, 198.168.32, 198.168.88, 198.168.210, and 198.168.110 as depicted in FIG. 2. The first AD service request from requesting device A 13 may be considered a computing job. Process orchestrator 450 may receive a second AD service request at the IP address published for AD service requests. The second AD service request may come from the same requesting device A 13, or from a different requesting device. Once process engine selector 456 assigns the processes associated with the second service request to the available process engines, computing jobs tracker unit 452 may map the process engines associated with the second service request to the second computing job.

In some examples, a process engine may not complete an assigned process. For example, the process engine may return an error, malfunction, lose connectivity or take longer than expected to complete the process. Process engine selector 456 may offload the incomplete process to a different process engine. Computing job tracker 452 may update the second computing job to map the new process engine to be associated with the second service request.

Figure 4:
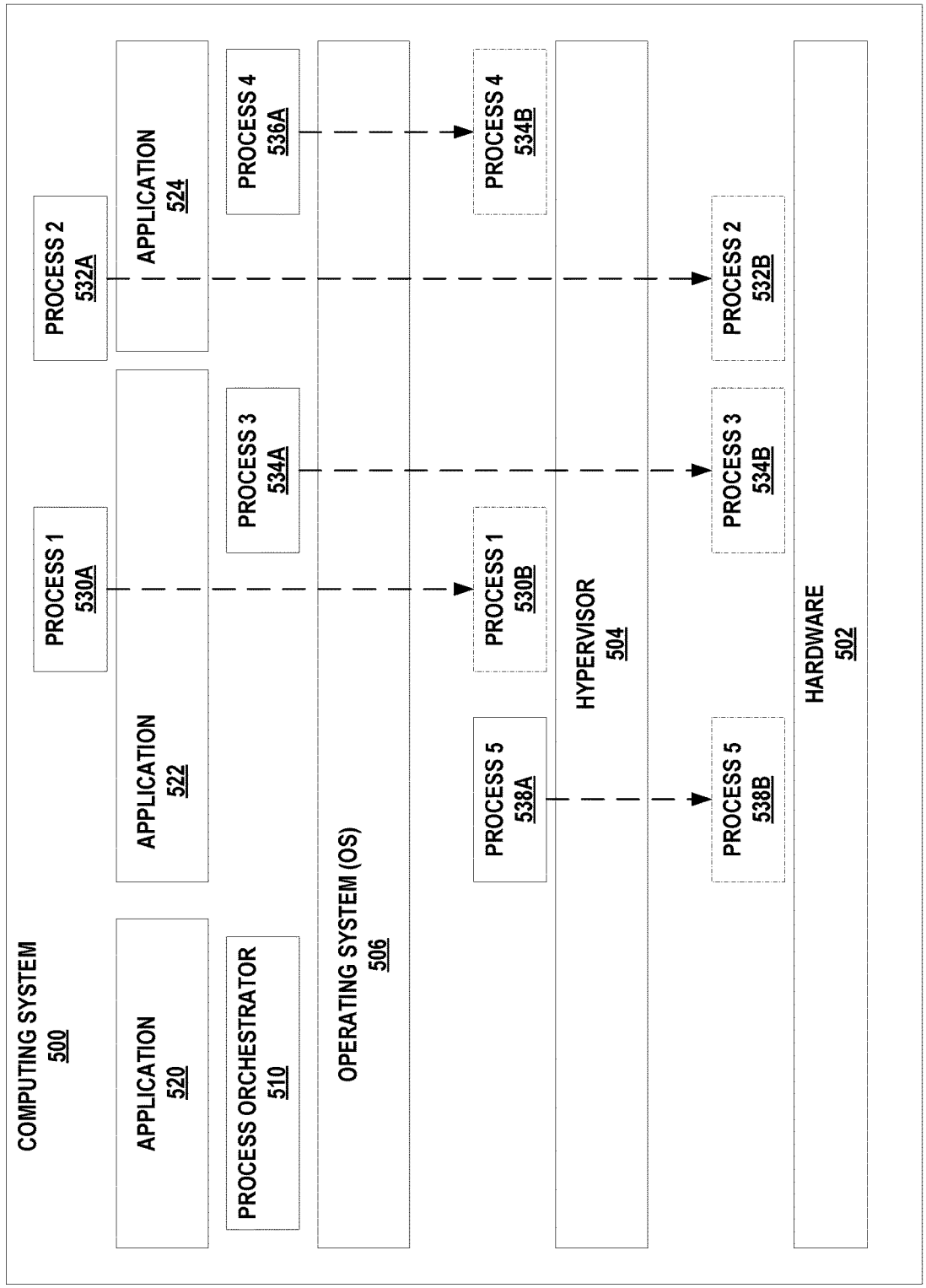
FIG. 4 is a block diagram illustrating the difference between a computing system according to existing techniques and example implementations of a computing system according to one or more techniques of this disclosure.

FIG. 4 is a block diagram illustrating the difference between a computing system according to existing techniques and example implementations of a computing system according to one or more techniques of this disclosure. Computing system 500 may include features similar to computing device 102 and computing device 400 described above in relation to FIGS. 2 and 4 respectively.

The example of computing system 500 in FIG. 4 includes a hardware level 502, hypervisor 504, OS 506 and applications 520-524 running on top of OS 506. Computing system 500 may be connected to a network (not shown in FIG. 4), such as network 20 depicted in FIGS. 1 and 2.

Hardware 502 may include one or more processors, memory, communication links and other components, similar to those components described above for computing device 400 in relation to FIG. 4. The one or more processors may execute instructions stored at a memory location to perform the functions of the other layers, e.g. hypervisor 504 and application 524. Hypervisor 504 may create and run virtual machines on computer hardware 502.

OS 506 may include any type of operating system that may run on hardware 502. Some examples of OS 506 may include Disk Operating System (DOS), Unix, Windows, Linux, Macintosh, and similar operating systems. OS 506 may require periodic updates to perform new functions, resolve bugs, improve security and other similar reasons. In some examples, OS 506 may also require a license from the OS distributor that may result in a cost to a user based on a subscription fee, one-time fee, upgrade fee and other similar costs.

One or more applications 520-524 may run on OS 506. Some examples of applications 520-524 may include a messaging application, text editing, video editing, spreadsheet and similar applications. As with OS 506, applications 520-524 may require periodic updates to resolve bugs, security issues, and add new features. An application may also include associated costs, such as subscription costs.

In operation, for example with infrastructure as a service (IaaS) may include multiple virtual machine servers running on a single physical host server to get more efficient use of the single physical host server. According to some examples, computing system 500 may handle service requests by running process associated with the service request at various levels. For example, process 1 530A and process 2 532A may run at the application level. Other processes associated with a service request may run at the OS 506 level, such as process 3 534A and process 4 536A.

In the example of FIG. 4, process orchestrator 510 runs at the OS level on OS 506. In other examples process orchestrator 510 may run as a virtual machine on the hypervisor level. Process orchestrator 510 performs similar functions to process orchestrator 12 described above in relation to FIG. 1, as well as other process orchestrators described in this disclosure. In contrast to other examples, this disclosure provides a means to virtualize all the way down to the process level.

Upon receiving a service request, process orchestrator 510 may assign a process to a process engine at an IP address at the hardware 502 level. In other words, instead of offloading a process to an IP address at the OS 506 level, such as process 3 534A, process orchestrator 510, according to the techniques of this disclosure, may offload process 3 to a process engine with an IP address at the hardware 502 level as shown by process 3 534B. Similarly, instead of offloading a process to at the application 524 level, such as process 2 532A, process orchestrator 510, according to the techniques of this disclosure, may offload process 2 to a process engine with an IP address at the hardware 502 level as shown by process 2 532B.

In other examples, process orchestrator 510 may assign a process to a virtualized process engine operating at the hypervisor 504 level. For example, instead of offloading a process to an IP address at the OS 506 level, such as process 4 536A, process orchestrator 510, according to the techniques of this disclosure, may offload process 4 to a process engine operating as a virtual machine with an IP address at the hypervisor 504 level as shown by process 4 534B. Similarly, instead of offloading a process to at the application 522 level, such as process 1 530A, process orchestrator 510, according to the techniques of this disclosure, may offload process 1 to a virtualized process engine with an IP address at the hypervisor 504 level as shown by process 1 530B. In other examples, the techniques of this disclosure may provide for moving a virtualized process, such as process 5 538A to be executed by a process engine with an IP address at the hardware level, as shown by process 5 538B.

Figure 5A:
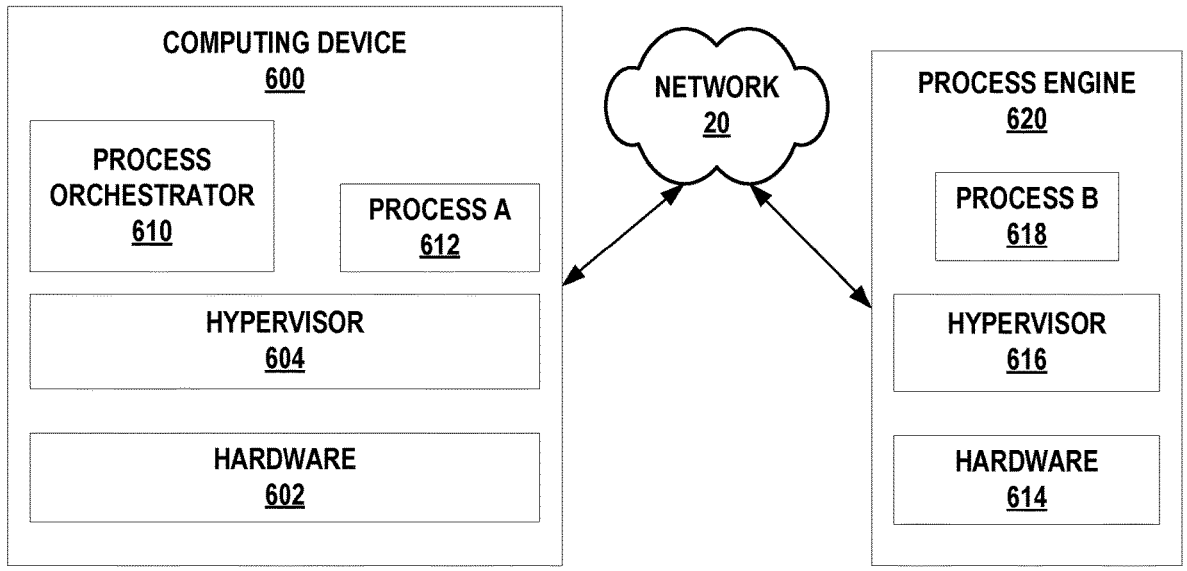
FIG. 5A is block diagram illustrating an example implementation of the PaaNSH using a virtualized process orchestrator and virtualized processes, according to one or more techniques of this disclosure.

FIG. 5A is block diagram illustrating an example implementation of the PaaNSH using a virtualized process orchestrator and virtualized processes according to one or more techniques of this disclosure. The example of FIG. 5A depicts computing device 600 and process engine 620 connected to network 20. Computing device 600 includes hardware 602, hypervisor 604, process orchestrator 610 and process A 612. Network 20 is the same as network 20 described above in relation to FIG. 1. Computing device 600 and process engine 620 are examples of computing system 500 depicted in FIG. 5. Therefore, the characteristics and functions of hardware 602, hypervisor 604, process orchestrator 610 and process A 612 as well as hardware 614, hypervisor 616 and process B 618 may be similar or the same as the characteristics and functions of, respectively, hardware 502, hypervisor 504, process orchestrator 510 and processes 530A-538B.

As described above in relation to FIGS. 1-5, process orchestrator 610 may receive a service request from a requesting device (not shown in FIG. 5A). Process orchestrator 610 may determine which back end process engines are available to run the processes associated with the service request. The process engines may be a virtualized process engine on the same hardware or on a different hardware connected to network 20, such as process engine 620. Process orchestrator 610 may offload the one or more processes to, for example a virtual IP address of a process engine operating at hypervisor 604, such as process A 612. Process orchestrator 610 may offload a second process, e.g. process B 618 to a second virtual IP address of a process engine operating at hypervisor 616. Process orchestrator 610 may offload other processes associated with the service request as needed to other process engines (not shown in FIG. 5A).

Process orchestrator 610 may receive an indication that process A 612 and process B 618 have been completed by the assigned process engines. Once all the process engines complete the processes that make up the service request, process orchestrator 610 may assemble the process results and make the results available to the requesting device via the IP address associated with the service request.

Figure 5B:
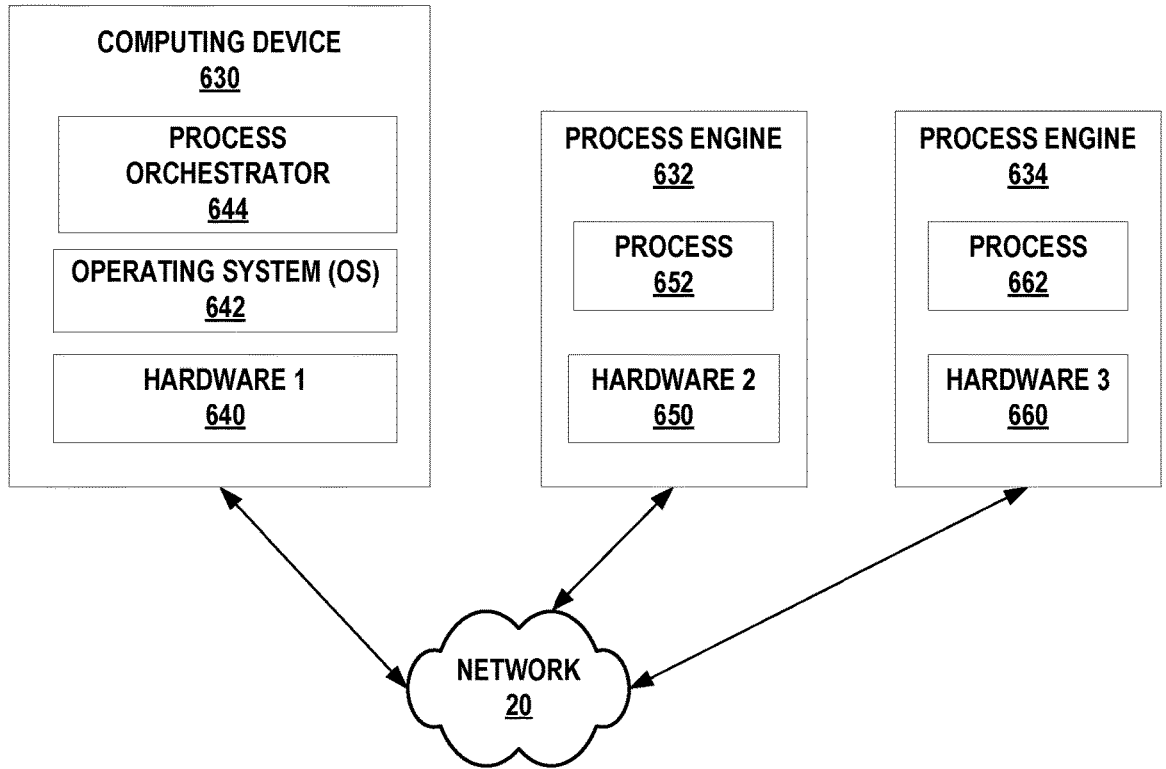
FIG. 5B is a block diagram illustrating an example implementation of the PaaNSH using a process orchestrator and processes running directly on hardware, according to one or more techniques of this disclosure.

FIG. 5B is a block diagram illustrating an example implementation of the PaaNSH using a process orchestrator and processes running directly on hardware according to one or more techniques of this disclosure. The example of FIG. 5B depicts computing device 630 and process engines 632 and 634 connected to network 20. Computing device 600 includes hardware 640, OS 642, and process orchestrator 644. Network 20 is the same as network 20 described above in relation to FIG. 1. Computing device 600 is an examples of computing system 500 depicted in FIG. 5. Therefore, the characteristics and functions of hardware 602, OS 642, and process orchestrator 610 may be similar or the same as the characteristics and functions of, respectively, hardware 502, OS 506, and process orchestrator 510.

In some examples, process engine 632 and process engine 634 may be implemented on small computing devices. Small computing devices may include one or more processors, memory, a communication unit, similar to communication unit 406 described above in relation to FIG. 4, and other similar components. Some examples of small computing devices may include devices such as Raspberry Pi, a system on a chip (SoC) such as Snapdragon™, or other small computing devices.

Process engine 632 and process engine 634 may be configured to run one or more processes associated with a service request. For example, process engine 632 may be configured to run one or more processes associated with an AD service request such as any or all of AD CS 150, AD FS 152, AD DS 154, AD LDS 156 and AD RMS 158 described above in relation to FIG. 2. In some examples small computing devices may not require an operating system, hypervisor and similar overhead.

By implementing a process engine on a small computing device connected to network 20, and registering the process engine with a process orchestrator, such as process orchestrator 644, the system of this disclosure may manage a request for service through a hub solution available on a network. In this manner, the underlying network fabric becomes the communication bus between individual processes that make up a service request. Instead of implementing many virtual servers running on a single server and serving only one requesting device, the current disclosure provides techniques for implementing multiple assigned processes that may run individually on multiple computing resources and be accessible on the network via a network address. A process engine on a small computing device may have the advantage of lower cost when compared to a host server because of the relatively lower cost for the device and reduced need for software license, updates to OS or hypervisor for security upgrades and similar updates, as well as reduced power consumption, administration and maintenance costs.

In operation, process orchestrator 644 may offload processes to any combination of hardware based process engines, such as process engine 632 and process engine 634, and virtualized process engines such as process engine 620 described above in relation to FIG. 5A. Process orchestrator 644 may assemble the completed results of a service request and make the results available to the requesting device, as described above in relation to FIGS. 1-6A.

Figure 6:
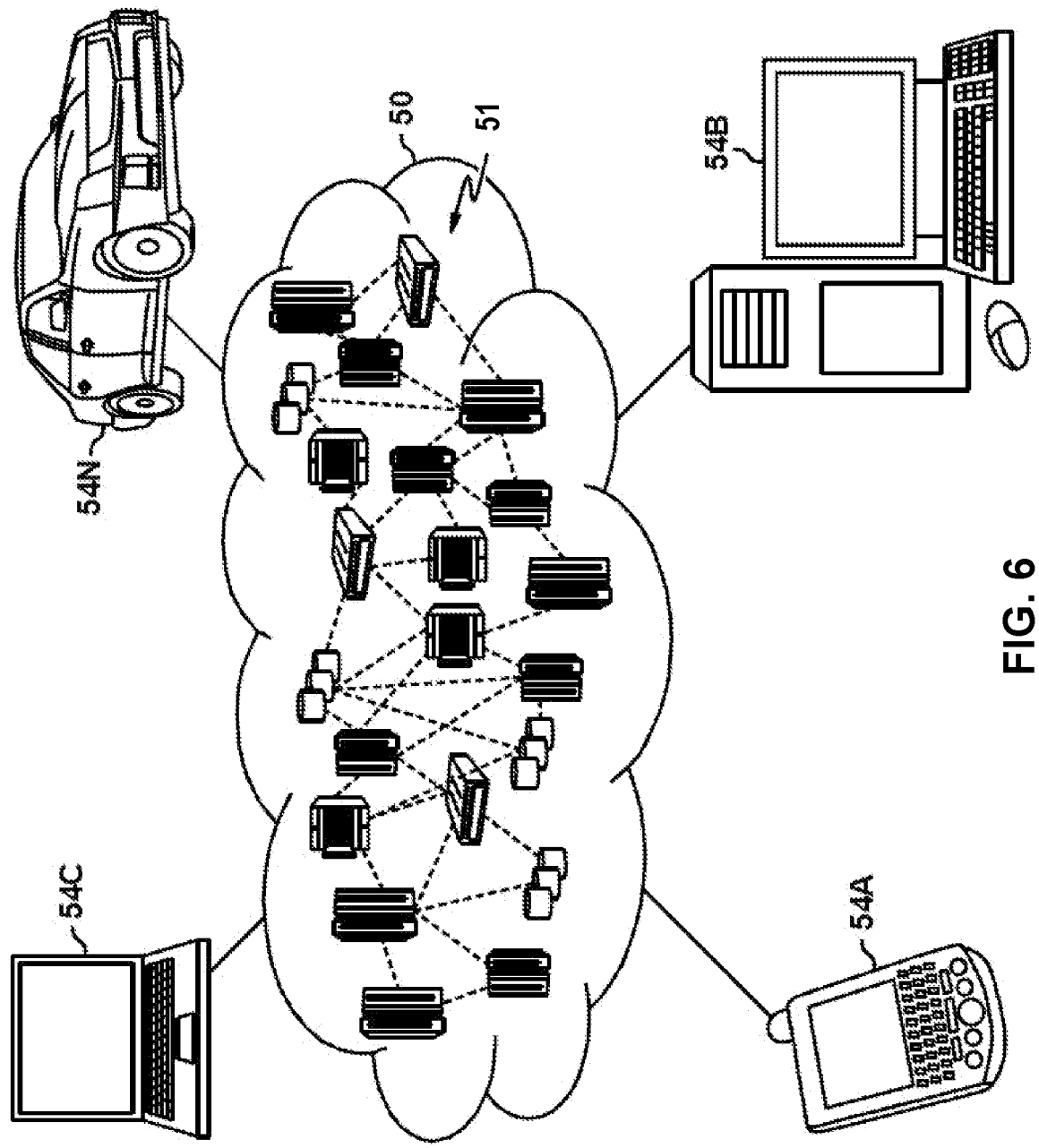
FIG. 6 is a diagram illustrating an example of a cloud computing environment, according to one or more techniques of this disclosure.

FIG. 6 is a diagram illustrating an example of a cloud computing environment. It is to be understood that although this disclosure includes a detailed description on cloud computing, implementation of the teachings recited herein are not limited to a cloud computing environment. Rather, examples of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of the cloud computing model of service may include: On-demand self-service, broad network access, rapid elasticity and measured service. On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may include, but are not limited to: Software as a Service (SaaS), Platform as a Service (PaaS) and Infrastructure as a Service (IaaS). Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models may include: private cloud, public cloud, community cloud, and hybrid cloud. Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
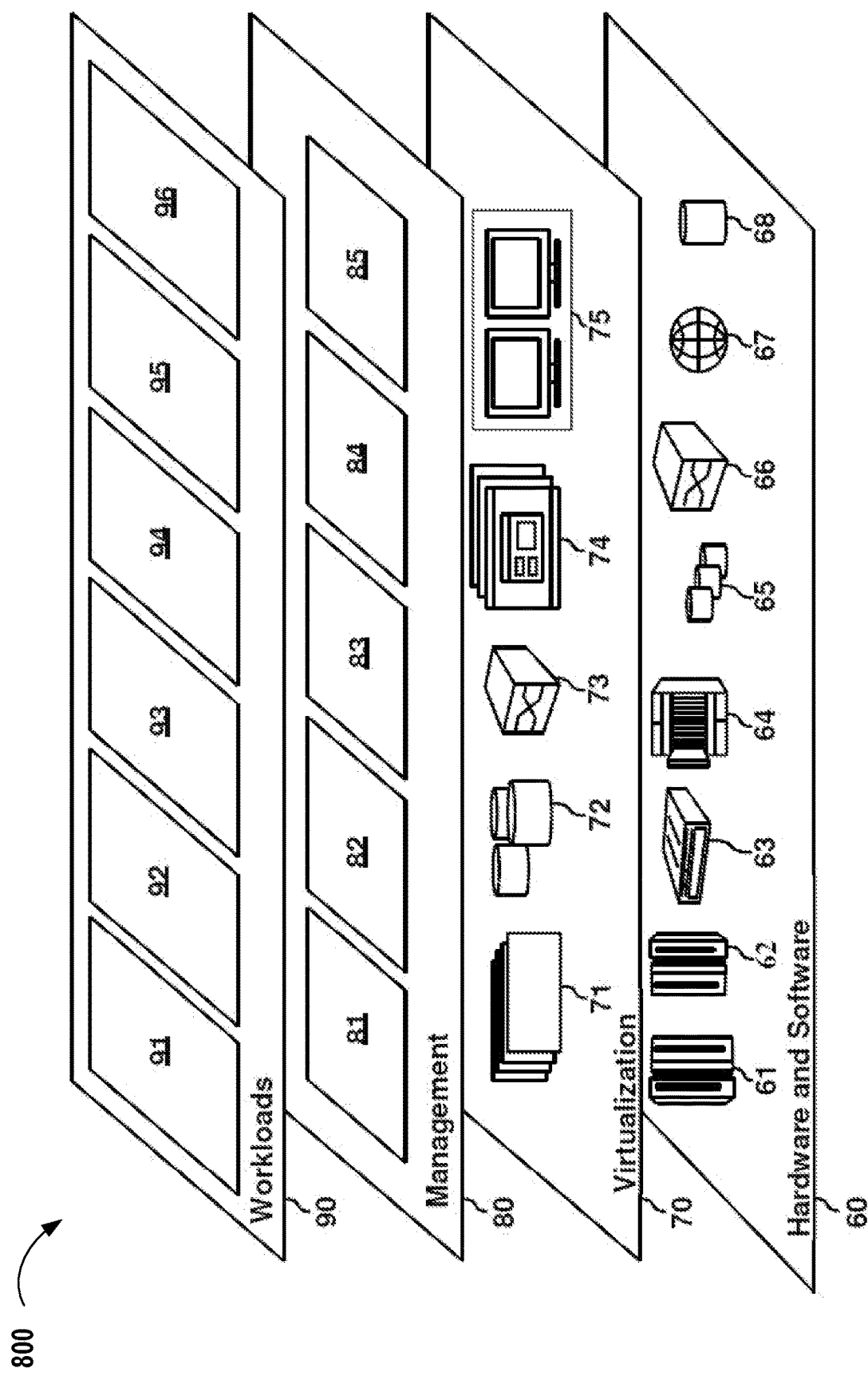
FIG. 7 is a conceptual diagram illustrating an example of abstraction model layers of a cloud computing environment, according to one or more techniques of this disclosure.

Referring now to FIG. 7, illustrative cloud computing environment 50 is depicted. As shown, cloud computing environment 50 includes one or more cloud computing nodes 51 with which local computing devices used by cloud consumers, such as, for example, personal digital assistant (PDA) or cellular telephone 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 51 and cloud computing environment 50 can communicate with any type of computerized device over any type of network and/or network addressable connection (e.g., using a web browser).

Referring now to FIG. 7, a set of functional abstraction layers provided by cloud computing environment 50, described above in relation to FIG. 7 is shown. It should be understood in advance that the components, layers, and functions shown in FIG. 7 are intended to be illustrative only and examples of the invention are not limited thereto.

As depicted, the following layers and corresponding functions are provided: Hardware and software layer 60 includes hardware and software components. Components in hardware and software layer 60 may be the same or similar to components in computing device 400 depicted in FIG. 4 and computing system 500 depicted in FIG. 5. Examples of hardware components include: mainframes 61; RISC (Reduced Instruction Set Computer) architecture based servers 62; servers 63; blade servers 64; storage devices 65; and networks and networking components 66. In some examples, software components include network application server software 67 and database software 68.

Virtualization layer 70 provides an abstraction layer from which the following examples of virtual entities may be provided: virtual servers 71; virtual storage 72; virtual networks 73, including virtual private networks; virtual process engines 74; and virtual clients 75. Virtualization layer 70 may also include a hypervisor. Virtual process engines 74 may execute one or more processes that make up a service request, similar to process engine 620 depicted in FIG. 5A and process engines executing process 1 530B and process 4 534B depicted in FIG. 5.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 8:
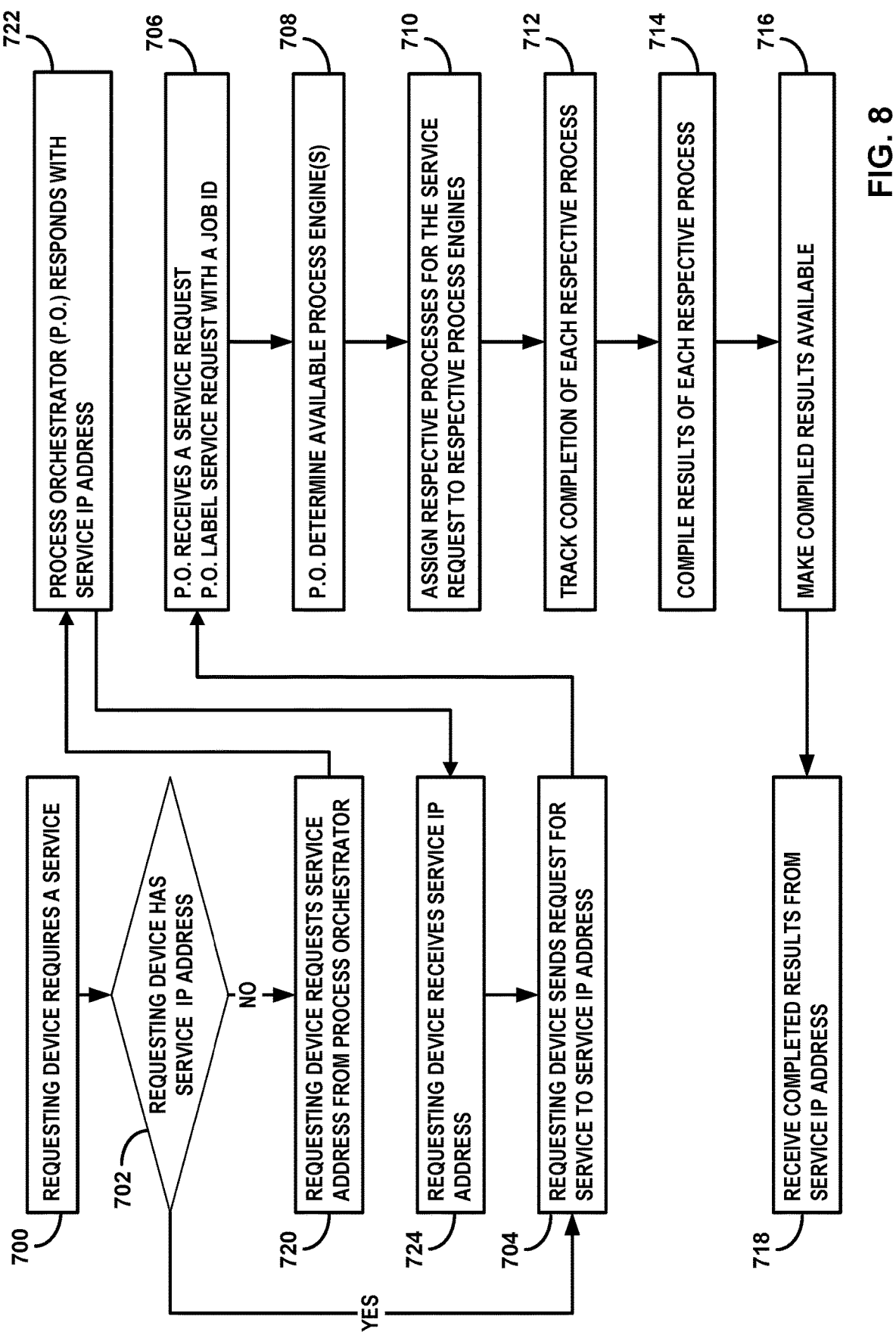
FIG. 8 is a flow chart illustrating an example operation of the PaaNSH, according to one or more techniques of this disclosure.

FIG. 8 is a flow chart illustrating an example operation of the PaaNSH, according to one or more techniques of this disclosure. The blocks of FIG. 8 will be described in terms of FIG. 2, unless otherwise noted.

A requesting device, such as requesting device A 13 may require a service, such as email, printing, AD, or similar services (700). The requesting device may consult a published list of services and the associated IP address for the service. In some examples the published list may be stored at a memory location accessible to the requesting device such as storage devices 65 depicted in FIG. 8. After retrieving the IP address for the associated service (YES branch of 702), the requesting device may send a request for service to the service IP address (704).

A process orchestrator (P.O.) may receive the service request and in some examples may label or map a computing job identification (job ID) to the service request for tracking purposes (706). The P.O. may determine which process engines are available to execute the one or more processes associated with the service request (708).

The P.O may assign respective processes associated with the service request to a respective process engine at a respective IP address associated with the respective process engine (710). In some examples the process engines may be implemented by small computing devices, as described above in relation to FIG. 5B.

The P.O. may track the completion of each respective process (712). In some examples, the P.O. may re-assign a process to a different process engine, if for example, the original process engine returns an error, or otherwise fails to complete a process within an expected time period.

The P.O. may compile, i.e. assemble, the results of each respective process (714) and make the completed results available to the requesting device (716). In some examples the requesting device may receive the completed results from the service IP address when sent by the P.O (718). In other examples, the requesting device may receive and indication that the completed results are available, and the requesting device may retrieve the results.

In some examples, the requesting device may not have the service IP address available (NO branch of 702). The requesting device may request the service address for the desired service from the P.O. (724). The P.O. may respond to the requesting device by sending the IP address to the requesting device (722). Once the requesting device receives the correct IP address for the desired service (724), the requesting device may send the request for service to the service IP address (704).

The example of FIG. 8 describes the operation of a system that may be considered a dispersed job scheduling and execution hub. In the example of an active directory computing job, the system may include a plurality of active directory process being executed at a plurality of physical locations. Each AD process may run on a single computing resource and be accessible on the network via an IP address. For an endpoint host requesting a service, the process orchestrator may receive a service request at the IP address that represents a requested service. The process orchestrator may be further adapted to seek available computing resources to run processes associated with active directory services, track completions, and compile individual jobs to provide the outcome to the requesting device via the assigned IP address.

Techniques of the present disclosure may be implemented as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or other processing circuitry. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) or other processing circuitry may execute the computer readable program instructions by utilizing state information of the computer readable program instructions to personalize the electronic circuitry, in order to perform aspects of the present invention. The computer readable program instructions may also be referred to as executable program code.

Aspects of the present disclosure are described herein with reference to flowchart illustrations and/or block diagrams of methods, apparatus (systems), and computer program products according to examples of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The techniques of this disclosure may also be described by the following examples.

Example 1. A computing system comprising: at least one processor communicatively coupled to a communication network and at least one computer-readable storage medium storing instructions that are executed by the at least one processor to: receive a service request from a requesting device, wherein the service request is associated with a network address; determine a plurality of processes that, once executed, will complete the service request; assign each process of the plurality of processes to a respective process engine communicatively coupled to the communication network. Responsive to receiving a respective process result from the respective process engine for each of the plurality of assigned processes, the instructions executed by the at least one processor to respond to the service request are further executed by the at least one processor to respond to the service request by making the process results available to the requesting device, via the network address, in order to indicate a completion of the service request.

Example 2: The computing system of example 1, wherein the instructions executed by the at least one processor to respond to the service request are further executed by the at least one processor to: track whether each of the plurality of assigned processes is complete; responsive to determining that each of the plurality of assigned processes is complete, assemble each respective process result of the plurality of assigned processes into a completed service request; and make the completed service request available to the requesting device.

Example 3: The computing system of any of example 2, wherein the instructions that are executed by the at least one processor comprise instructions to execute a process orchestrator unit, wherein the process orchestrator unit is configured to: assign each process of the plurality of processes to a respective process engine; and make the completed service request available to the requesting device.

Example 4: The computing system of any of example 3, wherein each respective process engine is associated with a process engine network address, and wherein each respective process engine is configured to register with the process orchestrator unit.

Example 5: The computing system of any of examples 3-4, wherein the process orchestrator unit is further configured to: determine an available process engine to execute the respective processes; and responsive to determining the available process engine, assign the respective process to the available process engine.

Example 6: The computing system of any of examples 3-5, wherein the process engine making the process results available to the requesting device comprises sending the completed service request to the requesting device via the network address associated with the service request.

Example 7: The computing system of any of examples 3-6, wherein the process orchestrator is further configured to make the process results available to the requesting device by sending a notification to the requesting device that the completed service request is available.

Example 8: The computing system of any of examples 3-7, wherein the process orchestrator is further configured to make the process results available to the requesting device comprises, in response to a query by the requesting device, by sending the completed service request to the requesting device via the network address associated with the service request.

Example 9: The computing system of any of examples 3-8, wherein the service request from the requesting device is a first service request and wherein the process orchestrator unit is further configured to: map a network address associated with each respective process engine that was assigned a process of the plurality of processes for the first service request to the first service request; receive a second service request from the requesting device; and map a network address associated with each respective process engine that was assigned a process of the plurality of processes for the second service request to the second service request.

Example 10. The computing system of any of examples 3-9, wherein the service request from the requesting device is a first service request and wherein the process orchestrator unit is further configured to: map a network address associated with each respective process engine that was assigned a process of the plurality of processes for the first service request to the first service request; receive a second service request from a second requesting device; and map a network address associated with each respective process engine that was assigned a process of the plurality of processes for the second service request to the second service request.

Example 11. The computing system of any of examples 1-10, wherein the network address is an Internet Protocol (IP) address.

Example 12. The computing system of any of example 11, wherein to determine whether the respective computing process engine is available to execute the respective assigned processes comprises determining whether the respective process engine resource has available computing and memory capacity bandwidth to execute the respective assigned processes.

Example 13. The computing system of any of examples 1-12, wherein the service request comprises an active directory (AD) service request.

Example 14. The computing system of any of example 13, wherein the one or more assigned processes that will complete the active directory service request comprise one or more of: an active directory certificate services (AD CS) job, an active directory domain services (ADDS) job, an active directory federation services (AD FS) job, an active directory lightweight directory services (AD LDS) job, or an active directory rights management services (AD RMS) job.

Example 15. A method comprising: receiving, by one or more processors, a service request from a requesting device, wherein the requesting device and the one or more processors are communicatively coupled to a communication network. The method also includes determining, by the one or more processors, a plurality of processes that, once the plurality of processes is executed, will complete the service request and assigning, by the one or more processors, each respective process of the plurality of processes to a respective computing resource communicatively coupled to the communication network. Responsive to receiving a respective process result from the respective computing resource for each of the plurality of assigned processes, responding, by the one or more processors, to the service request at least by sending the process results to the requesting device in order to indicate a completion of the service request.

Example 16. The method of example 15, wherein the service request is associated with an Internet Protocol (IP) address, the method further comprising: receiving, by the one or more processors, an address request from the requesting device for the associated IP address to be used for the service request; sending, by the one or more processors, the associated IP address to the requesting device.

Example 17. The method of any of examples 15-16, wherein responding to the service request further comprises: tracking, by the one or more processors, whether each processes of the plurality of assigned processes is complete; responsive to determining that each of the plurality of assigned processes is complete, assembling, by the one or more processors, each respective process result of the plurality of assigned processes into a completed service request; and sending, by the one or more processors, the completed service request to the requesting device.

Example 18. A computer program product comprising a computer-readable storage medium having program code stored therewith, the program code executable by at least one processor to: receive a service request from a requesting device, wherein the service request is associated with a network address; determine a plurality of processes that, once executed, will complete the service request and assign each process of the plurality of processes to a respective process engine communicatively coupled to the communication network. Responsive to receiving a respective process result from the respective process engine for each of the plurality of assigned processes, respond to the service request by making the process results available to the requesting device, via the network address, in order to indicate a completion of the service request.

Example 19. The computer program product of example 18, wherein the program code to respond to the service request is further executable by the at least one processor to: track whether each of the plurality of assigned processes is complete; responsive to determining that each of the plurality of assigned processes is complete, assemble each respective process results of the plurality of assigned processes into a completed service request; and send the completed service request to the requesting device.

Example 20. The computer program product of any of claims 18-19, wherein the program code executable by the at least one processor to assign each computing job to the respective computing resource is further executable by the at least one processor to: determine an available process engine to execute the respective process; and responsive to determining the process engine is available, assign the respective process to the available process engine.

Various examples of the disclosure have been described. These and other examples are within the scope of the following claims.

The invention claimed is:

1. A computing system comprising:
at least one processor communicatively coupled to a communication network;
at least one computer-readable storage medium storing instructions that are executed by the at least one processor to:
receive a first service request from a requesting device, wherein the first service request is associated with a network address, and wherein the first service request comprises an active directory (AD) service request;
determine a plurality of virtual processes that, once executed, will complete the first service request;
assign each virtual process of the plurality of virtual processes to a respective process engine of a virtual machine communicatively coupled to the communication network;
responsive to receiving a respective process result from the respective process engine for each of the plurality of assigned virtual processes, respond to the first service request by making the process results available to the requesting device, via the network address, in order to indicate a completion of the first service request;
track whether each of the plurality of assigned virtual processes is complete; and
execute a process orchestrator unit that is configured to:
assign each virtual process of the plurality of virtual processes to a respective process engine;
make the completed service request available to the requesting device;
map a network address associated with each respective process engine that was assigned a virtual process of the plurality of virtual processes for the first service request to the first service request;

receive a second service request from the requesting device; and map a network address associated with each respective process engine that was assigned a process of the plurality of processes for the second service request to the second service request.

2. The computing system of claim 1, wherein each respective process engine is associated with a process engine network address, and wherein each respective process engine is configured to register with the process orchestrator unit.

3. The computing system of claim 1, wherein the process orchestrator unit is further configured to:

determine an available process engine to execute the respective virtual processes; and responsive to determining the available process engine, assign the respective virtual process to the available process engine.

4. The computing system of claim 1, wherein the process engine making the process results available to the requesting device comprises sending the completed service request to the requesting device via the network address associated with the first service request.

5. The computing system of claim 1, wherein the process orchestrator is further configured to make the process results available to the requesting device by sending a notification to the requesting device that the completed service request is available.

6. The computing system of claim 1, wherein the process orchestrator is further configured to make the process results available to the requesting device comprises, in response to a query by the requesting device, by sending the completed service request to the requesting device via the network address associated with the first service request.

7. The computing system of claim 1, wherein the network address is an Internet Protocol (IP) address.

8. The computing system of claim 7, wherein to determine whether the respective process engine is available to execute the respective assigned virtual processes comprises determining whether the respective process engine has available computing and memory capacity bandwidth to execute the respective assigned virtual processes.

9. The computing system of claim 1, wherein the one or more assigned virtual processes that will complete the active directory service request comprise one or more selected from a group consisting of: an active directory certificate services (AD CS) job, an active directory domain services (ADDS) job, an active directory federation services (AD FS) job, an active directory lightweight directory services (AD LDS) job, and an active directory rights management services (AD RMS) job.

10. A method comprising:

receiving, by one or more processors, a first service request from a requesting device, wherein the requesting device and the one or more processors are communicatively coupled to a communication network, and wherein the first service request comprises an active directory (AD) service request;

determining, by the one or more processors, a plurality of virtual processes that, once the plurality of virtual processes is executed, will complete the first service request;

assigning, by the one or more processors, each respective virtual process of the plurality of virtual processes to a respective computing resource of a virtual machine communicatively coupled to the communication network;

responsive to receiving a respective process result from the respective computing resource for each of the plurality of assigned virtual processes, responding, by the one or more processors, to the first service request at least by sending the process results to the requesting device in order to indicate a completion of the first service request;

tracking whether each of the plurality of assigned virtual processes is complete; and executing a process orchestrator unit that is configured to:

assign each virtual process of the plurality of virtual processes to a respective process engine;

make the completed service request available to the requesting device;

map a network address associated with each respective process engine that was assigned a virtual process of the plurality of virtual processes for the first service request to the first service request;

receive a second service request from the requesting device; and map a network address associated with each respective process engine that was assigned a process of the plurality of processes for the second service request to the second service request.

11. The method of claim 10, wherein the first service request is associated with an Internet Protocol (IP) address, the method further comprising:

receiving, by the one or more processors, an address request from the requesting device for the associated IP address to be used for the first service request;

sending, by the one or more processors, the associated IP address to the requesting device.

12. A computer program product comprising a computer-readable storage medium having program code stored therewith, the program code executable by at least one processor to:

receive a first service request from a requesting device that is coupled to a communication network, wherein the first service request is associated with a network address and wherein the first service request comprises an active directory (AD) service request;

determine a plurality of virtual processes that, once executed, will complete the first service request;

assign each virtual process of the plurality of processes to a respective process engine of a virtual machine communicatively coupled to the communication network;

responsive to receiving a respective process result from the respective process engine for each of the plurality of assigned virtual processes, respond to the first service request by making the process results available to the requesting device, via the network address, in order to indicate a completion of the first service request;

track whether each of the plurality of assigned virtual processes is complete; and execute a process orchestrator unit that is configured to:

assign each virtual process of the plurality of virtual processes to a respective process engine;

make the completed service request available to the requesting device;

map a network address associated with each respective process engine that was assigned a virtual process of the plurality of virtual processes for the first service request to the first service request;

receive a second service request from the requesting device; and map a network address associated with each respective process engine that was assigned a process of the plurality of processes for the second service request to the second service request.

13. The computer program product of claim 12, wherein the program code executable by the at least one processor to assign each computing job to the respective computing resource is further executable by the at least one processor to:

determine an available process engine to execute the respective virtual process; and responsive to determining the process engine is available, assign the respective virtual process to the available process engine.

* * * * *